Patented Mar. 19, 1946

2,396,789

UNITED STATES PATENT OFFICE 2,396,789

ESTERS

Madison Hunt, Wilmington, Del., assignor to E. I. du Pont de Nemours & Company, Wilmington, Del., a corporation of Delaware No Drawing. Application March 3, 1944, Serial No. 524,920

5 Claims. (Cl. 260—455)

This invention relates to esters.

The invention has as an object the preparation of new esters. Another object is the preparation of new pharmaceutically useful materials. A further object is the provision of new pest-control agents. Other objects will appear hereinafter.

These objects are accomplished by the invention of esters of the formula

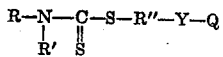

wherein

R and R' are hydrogen, hydrocarbon, or radicals which together, in combination with the nitrogen, form a heterocyclic ring, at least two valences of the nitrogen are joined to carbon, i. e., there is not more than one hydrogen on the nitrogen;

R'' is a bivalent acyclic hydrocarbon radical;

Y is a chalcogen of atomic weight less than 33; and

Q is hydrogen, a hydrocarbon radical (which may be interrupted by a chalcogen of atomic weight less than 33, i. e., oxygen or sulfur) or an acyl radical;

and of the process for making these esters by reacting a salt of a dithiocarbamic acid

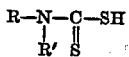

with a halide of the formula

wherein X is a halogen, R, R', R'', Y and Q being as above.

The more detailed practice of the invention is illustrated by the following example wherein parts given are by weight. There are, of course, many forms of the invention other than this specific embodiment.

Example

To a solution of 56.7 parts of sodium dimethyldithiocarbamate in 80 parts of ethyl alcohol is added 36 parts of monochloromethyl butyl ether. The mixture is then heated while stirring for one hour at the boiling point of ethyl alcohol. The reaction mixture is then poured into 1000 parts of water and the product is extracted with ether and dried over magnesium sulfate. Upon distillation, 27 parts of butoxymethyl dimethyl-dithiocarbamate, boiling at 136–137° C. at 2 mm. and having a $n_D^{25}$ of 1.5551 and a specific gravity at 25° C. of 1.0823 is obtained. Analysis: Calculated for $C_8H_{17}ONS_2$: N, 6.76. Found: N, 6.69.

Other esters of dimethyldithiocarbamic acid which are prepared according to the general procedure described above include ethoxymethyl dimethyldithiocarbamate, beta-hydroxyethyl dimethyldithiocarbamate, beta-acetyl thioethyl dimethyldithiocarbamate, gamma-mercaptopropyl dimethyldithiocarbamate and 2-(2-n-butylthioethoxy) ethyl dimethyldithiocarbamate. Although the invention is illustrated by the reaction of the sodium salt of dimethyldithiocarbamic acids with halogen compounds to form esters, it is applicable to salts of dithiocarbamic acids in general. Examples of other salts of dithiocarbamic acids are sodium methyldithiocarbamate, calcium ethyldithiocarbamate, zinc cyclohexyldithiocarbamate, magnesium benzyldithiocarbamate, sodium phenyldithiocarbamate, sodium diethyldithiocarbamate, sodium dibutyldithiocarbamate, sodium dicyclohexyldithiocarbamate, sodium phenylethyldithiocarbamate, sodium dibenzyldithiocarbamate, sodium pentamethylenedithiocarbamate, sodium methylphenyldithiocarbamate, sodium 4-morpholinecarbodithioate and sodium hexamethylenedithiocarbamate. Halogen compounds in addition to monochloromethyl butyl ether which can be used to react with the salts of the dithiocarbamic acids include monochloromethyl methyl ether, ethylene bromohydrin, beta-chloroethyl thiolacetate, beta-chloro-ethyl methoxyacetate, gamma-mercaptopropyl chloride, 2-(2-n-butylthioethoxy) ethyl chloride, methoxyethoxyethyl chloride, trimethylene chlorohydrin, beta-chloroethyl mercaptan, and beta-methoxyethyl chloride.

Other solvents can be used in addition to ethyl alcohol as the medium for the preparation of the esters of the dithiocarbamic acids. These include alcohols, such as methyl alcohol, propyl alcohol and isobutyl alcohol, ethers such as dioxane, and water.

The temperature of the reaction is generally carried out within the range of 0° to 100° C. In general, it is convenient to operate at the boiling point of the solvent used.

The products of this invention are useful for various commercial purposes. They may be used as pharmaceutical and pest-control agents, e. g., insecticides, bactericides, fungicides, moth-proofing agents and as additive agents for elastomers.

As many apparently different embodiments of this invention may be made without departing from the spirit and scope thereof, it is to be understood that this invention is not limited to the specific embodiments thereof, except as defined in the appended claims.

What is claimed is:

1. An ester of the formula

R—N—C—S—R″—Y—Q
 |  ||
 R'  S wherein at least two valences of the nitrogen are joined to carbon, R and R' are selected from the class consisting of hydrogen and hydrocarbon radicals, R″ is a bivalent acyclic hydrocarbon radical, Y is a chalcogen of atomic weight less than 33, and Q is a monovalent hydrocarbon radical.

2. An ester of the formula

CH₃—N—C—S—R″—Y—Q
 |  ||
 CH₃ S wherein R″ is a bivalent acyclic hydrocarbon radical, Y is a chalcogen of atomic weight less than 33, and Q is a monovalent hydrocarbon radical.

3. Butoxymethyl dimethyldithiocarbamate.

4. Process for preparing esters which comprises reacting a salt of an acid of the formula

R—N—C—SH
 |  ||
 R'  S wherein at least two valences of the nitrogen are satisfied by carbon, and R and R' are selected from the class consisting of hydrogen and hydrocarbon radicals with a halide of the formula

X—R″—Y—Q wherein X is halogen, R″ is a bivalent acyclic hydrocarbon radical, Y is a chalcogen of atomic weight less than 33 and Q is monovalent hydrocarbon radical.

5. Process for preparing an ester which comprises reacting sodium dimethyldithiocarbamate with butoxymethyl chloride.

MADISON HUNT.